F. H. ROYCE.
LOCKING AND ADJUSTING DEVICE FOR LINKWORK.
APPLICATION FILED JUNE 6, 1914.

1,128,524.

Patented Feb. 16, 1915.

WITNESSES
H. E. Bready
H. S. J. Dunbar Jr.

INVENTOR
F. H. Royce.
per Percy H. Moore
Attorney.

UNITED STATES PATENT OFFICE.

FREDERICK HENRY ROYCE, OF DERBY, ENGLAND.

LOCKING AND ADJUSTING DEVICE FOR LINKWORK.

1,128,524.   Specification of Letters Patent.   Patented Feb. 16, 1915.

Application filed June 6, 1914. Serial No. 843,553.

*To all whom it may concern:*

Be it known that I, FREDERICK HENRY ROYCE, a subject of the King of Great Britain and Ireland, and residing at Nightingale Road, Osmaston Road, Derby, England, have invented certain new and useful Improvements in Locking and Adjusting Devices for Linkwork, of which the following is a specification.

This invention relates to improvements in adjusting and locking devices for varying the relative angular positions of two or more levers mounted about a common axis and locking same in position after adjustment.

As is well-known, it is often desirable to make provision for adjustment, for instance, in brake operating gear of motor vehicles wherein the foot or hand operating lever has a limited angular motion or arc of travel. In such case when the brakes become worn it is necessary to adjust the levers back to their original positions in order to prevent them becoming inoperative due to the arc of effective travel becoming too small.

By the present invention a form of adjustment is provided, which is effected without any axial movement of the levers and which enables the adjustment to be made at any required distance away from the actuating levers, which can therefore be arranged in the most convenient positions having regard to the work they have to perform.

According to the present invention, the levers each have a tubular boss, that of one lever having an internal right-hand screw thread and that of the other lever having a left-hand screw thread. A sleeve carried and supported by a tube and having a right-hand threaded portion and a left-hand screwed portion engages with the screwed bosses of the two levers, the connection between the sleeve and tube being such that they have free relative movement axially but have no independent relative rotary movement. Internal means is provided for laterally moving the sleeve and for automatically positively locking said sleeve after movement.

Figure 1:
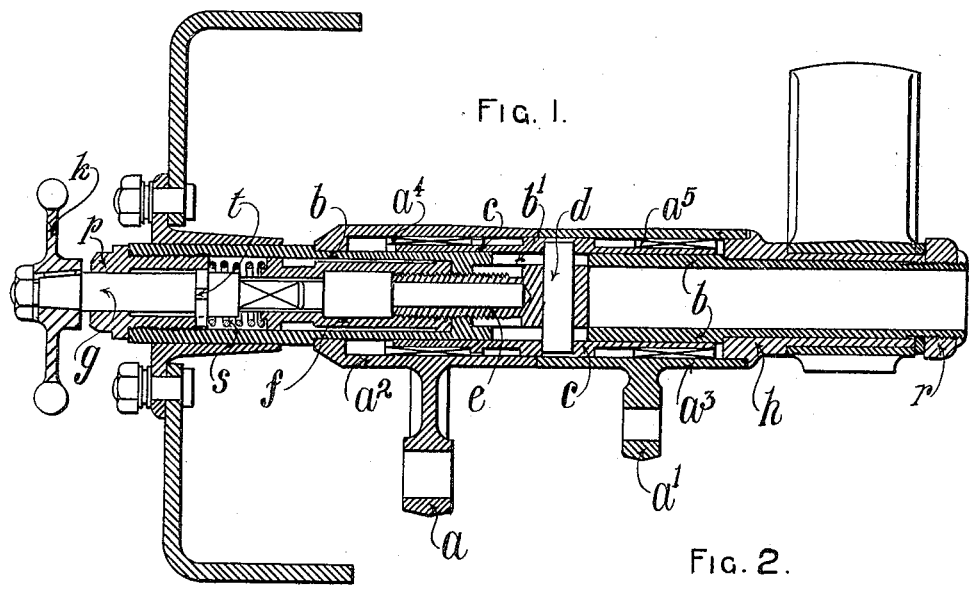
Figure 2:
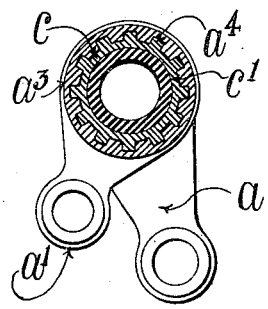
Figure 3:
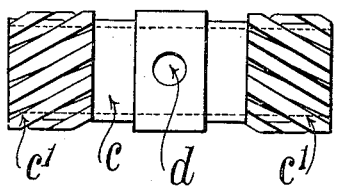

In the accompanying drawing which illustrates this invention applied to the brake levers of motor road vehicles:—Figure 1 is a sectional view in side elevation. Fig. 2 is a view in transverse section, and Fig. 3 is a view in side elevation of the right and left-handed screwed sleeve.

Throughout the views similar parts are marked with like letters of reference.

The levers $a$ and $a^1$ have bosses $a^2$ and $a^3$ which respectively have right and left-handed helical grooves $a^4$ and $a^5$ cut in them to correspond and engage with helical projections $c^1$ on a sleeve $c$ which is loosely mounted on a tube $b$. Carried by the sleeve $c$ is a pin $d$ which engages longitudinally arranged slots $b^1$ in the tube $b$, thus permitting of relative longitudinal movement between said parts but preventing any relative rotary motion between same. On the pin $d$ is mounted a longitudinally disposed eye bolt $e$ on to which is screwed a sleeve nut $f$, the outer end of which has a square hole adapted to receive the squared end of a longitudinally arranged key $g$ which is mounted to rotate in a suitable bearing $p$ in the tube $b$ and is provided with an operating hand wheel $k$. The bearing $p$, which consists of a plug screwed into the tube $b$, is provided at its inner end with teeth which engage with recesses $t$ in a collar $t^1$ on the key $g$ and thus operate to lock said key to the tube $b$. It will be seen that when the tube $b$ is rotated in any manner as by rotating the hand wheel $k$ while the key $g$ is in engagement with the tube, the sleeve $c$ will rotate therewith.

To adjust the angle between the levers $a$ and $a^1$, the key $g$ is pressed inward against the pressure of a suitable spring such as $s$ until the teeth on the key $g$ are disengaged from the slots $t$. The key is then rotated by the hand wheel $k$ whereby rotary motion is imparted to the nut $f$ which by reason of its screw threaded connection imparts longitudinal movement to the eye bolt $e$ which in turn imparts longitudinal movement to the sleeve $c$ causing the levers $a$ and $a^1$ to be rotated in opposite directions.

The tube $b$ is supported by a distance piece $h$ to which it is locked by a nut $r$, said distance piece operating to locate the tube and the levers $a$ and $a^1$ endwise.

What I claim as my invention and desire to secure by Letters Patent is:—

1. Apparatus for adjusting levers angularly about a common center and locking them in any desired position relative to one another, comprising two internally screw-threaded sleeve-like bosses each carrying a lever, the screw thread of one being left-handed and that of the other right-handed, a sleeve provided with threads corresponding to and engaging with the internal threaded bosses of the two levers, a supporting tube carrying said sleeve, means for preventing axial movement of the two levers in relation to said tube, and of means for reciprocating said sleeve.

2. Apparatus for adjusting levers angularly about a common center and locking them in any desired position relative to one another, comprising two internally screw-threaded sleeve-like bosses each carrying one of the levers, the screw thread of one being left-handed and that of the other right-handed, a sleeve provided with threads corresponding to and engaging with the internal threaded bosses of the two levers, a supporting tube carrying said sleeve, means for preventing axial movement of the two levers in relation to said tube, means for reciprocating said sleeve through the interior of the supporting tube, and of means for automatically locking the levers in position after adjustment.

3. In an apparatus for adjusting levers angularly in relation to one another about a common center, the combination with the levers of sleeve-like bosses carried by said levers and having internal screw-threads the screw thread of one being left-handed and that of the other right-handed, of a sleeve provided with threads corresponding to and engaging the internally threaded bosses carrying the levers, of a supporting tube carrying said sleeve, of means for preventing axial movement of the two levers in relation to said tube, of means for coupling the sleeve to the tube so that they have common rotary movement but free longitudinal movement, and of means for imparting longitudinal movement to said coupling mechanism.

4. In an apparatus for adjusting levers angularly in relation to one another about a common center, the combination with the levers of sleeve-like bosses carried by said levers and having internal screw-threads the screw thread of one being left-handed and that of the other right-handed, of a sleeve provided with threads corresponding to and engaging the internally threaded bosses carrying the levers, of a supporting tube carrying said sleeve, of means for preventing axial movement of the two levers in relation to said tube, of a pin adapted to couple the sleeve to the tube so that they have a common rotary movement but independent relative longitudinal movement, of a longitudinally arranged eye bolt carrying said pin, of a rotating nut threaded on to said eye bolt, and of means for rotating said nut.

5. In an apparatus for adjusting levers angularly about a common center in any desired position relative to one another, the combination with the levers of internally threaded bosses carried by said levers the screw thread of one being left-handed and that of the other right-handed, of a sleeve provided with threads corresponding to and engaging with said internal threaded bosses, of a fixed tube carrying said sleeve, of means for preventing axial movement of the two levers in relation to said tube, of a pin coupling the sleeve to the tube so that they both have a common rotary movement but independent longitudinal movement, of screw mechanism for imparting longitudinal movement to said pin, of means for operating said mechanism and for locking same after adjustment.

In testimony whereof I have hereunto signed my name in the presence of two subscribing witnesses.

FREDERICK HENRY ROYCE.

Witnesses:
 CONSTANCE POPPLETON,
 MAURICE OLLEY.

Copies of this patent may be obtained for five cents each, by addressing the "Commissioner of Patents, Washington, D. C."